US008466576B2

(12) United States Patent
Onsrud

(10) Patent No.: US 8,466,576 B2
(45) Date of Patent: Jun. 18, 2013

(54) GENERATOR FOR FLUID-DRIVEN PRODUCTION OF ELECTRIC ENERGY AND A METHOD OF MAKING THE GENERATOR

(75) Inventor: Gisle Onsrud, Vikhammer (NO)

(73) Assignee: Reslink AS, Algard (NO)

( * ) Notice: Subject to any disclaimer, the term of this patent is extended or adjusted under 35 U.S.C. 154(b) by 670 days.

(21) Appl. No.: 12/279,718

(22) PCT Filed: Feb. 16, 2007

(86) PCT No.: PCT/NO2007/000055
§ 371 (c)(1),
(2), (4) Date: Sep. 7, 2010

(87) PCT Pub. No.: WO2007/094685
PCT Pub. Date: Aug. 23, 2007

(65) Prior Publication Data
US 2011/0012354 A1 Jan. 20, 2011

(30) Foreign Application Priority Data
Feb. 17, 2006 (NO) .................................. 20060795

(51) Int. Cl.
*F03B 13/00* (2006.01)
(52) U.S. Cl.
USPC .............................................. 290/54; 290/43
(58) Field of Classification Search
USPC .............................. 290/43, 44, 54, 55; 310/12
See application file for complete search history.

(56) References Cited

U.S. PATENT DOCUMENTS

| | | | |
|---|---|---|---|
| 3,867,655 A * | 2/1975 | Stengel et al. | 310/66 |
| 4,101,874 A * | 7/1978 | Denison et al. | 340/606 |
| 4,488,055 A * | 12/1984 | Toyama | 290/53 |
| 4,936,508 A | 6/1990 | Ingalz | |
| 5,374,239 A * | 12/1994 | Mischenko | 604/8 |
| 6,011,334 A | 1/2000 | Roland | |
| 6,848,503 B2 | 2/2005 | Schultz et al. | |
| 7,067,936 B2 * | 6/2006 | Baarman et al. | 290/43 |
| 7,257,999 B2 * | 8/2007 | Goldfarb | 73/149 |
| 7,956,481 B2 * | 6/2011 | Baarman et al. | 290/54 |
| 8,026,622 B2 * | 9/2011 | Thackston | 290/43 |
| 8,294,292 B2 * | 10/2012 | Irwin et al. | 290/54 |

FOREIGN PATENT DOCUMENTS
DE 3403769 A1 8/1985
WO 9701018 A1 1/1997

* cited by examiner

*Primary Examiner* — Nicholas Ponomarenko

(57) ABSTRACT

A generator (20) for in situ fluid-driven production of electric energy and also a method of making the generator (20), which comprises a stator and a rotor. The stator is formed as a turbine housing (1) having at least one internal cavity (2) within which at least one independent rotor body (3) is arranged without a fixed mechanical support in the turbine housing (1). The turbine housing (1) comprises at least one supply channel (8) and at least one discharge channel (9) connected to the cavity (2) for throughput of a generator-driving fluid (13). The cavity (2) is of a circular shape along at least one path of rotation therein, whereas the rotor body (3) is of a rotary-symmetrical shape for allowing rotation thereof along said path of rotation. The turbine housing (1) is provided with at least one coil (5) at the periphery of the cavity (2), whereas the rotor body (3) is provided with at least one permanent magnet (4) at the periphery of the rotor body (3).

20 Claims, 5 Drawing Sheets

GENERATOR FOR FLUID-DRIVEN PRODUCTION OF ELECTRIC ENERGY AND A METHOD OF MAKING THE GENERATOR

AREA OF THE INVENTION

The invention concerns a generator for fluid-driven production of electric energy by means of electromagnetic induction. Although not being a prerequisite, the generator is intended to be driven primarily by a fluid flow through a tubular object, for example a pipe. The fluid may be comprised of a liquid and/or a gas, for example water, oil and/or a hydrocarbon gas in a well. The invention also comprises a method of making such a generator.

More particularly, the invention concerns a generator comprising a turbine device placed in a cavity in a turbine housing, in which the turbine device may rotate in said cavity without having any form of fixed, mechanical support in the turbine housing.

The invention is especially relevant for use in narrow and/or inaccessible places in which electric cables are difficult to place, or in which maintenance is difficult to carry out, for example replacement of batteries. Typically, such narrow and/or inaccessible places exist in subterranean wells, for example petroleum wells and injection wells, but also in connection with subsea structures and subsea-placed equipment. The invention may also be used under conditions in which the fluid, which is intended to drive an energy-producing generator, contains particles capable of causing erosion and damage to mechanical bearings in the generator, and in which use of such mechanical bearings therefore is undesirable.

BACKGROUND OF THE INVENTION

A large number of subterranean wells, including petroleum wells and injection wells, are equipped with various instruments, control devices, operating equipment (for example valves) and similar requiring a supply of electric energy. Typically, such a supply is provided by means of electric cables extending from the surface, or by means of batteries requiring replacement when depleted. Both solutions are associated with great disadvantages.

The use of electric cables contributes large costs and greater technical complexity to the wells. Many errors of such instrumented wells are known to be caused by malfunction in electric cables and/or in electric contacts/connectors for such cables.

A substantial disadvantage of using batteries is the high cost associated with replacement of the batteries. This particularly relates to so-called subsea wells, in which the wellhead is placed on a sea floor. When replacing the batteries in such wells, special vessels (ships or rigs) normally have to be contracted for carrying out maintenance. This is costly and also depends on weather conditions and availability of the vessels.

As a consequence of the abovementioned disadvantages, there is great interest in the industry for technical solutions allowing electric energy to be generated in situ within a well.

PRIOR ART AND DISADVANTAGES THEREOF

A number of patent publications exist relating to such technical solutions for in situ generation of electric energy in a well.

In this connection, it must be mentioned that an average electric power requirement for an instrumented well could be in the order of 1 watt. During shorter periods, however, a substantially larger power requirement could exist, for example in connection with the opening and closing of valves in the well. As such, there may be a need for systems and devices for storing electric energy in order to service such larger power requirements.

Much of the prior art for in situ generation of electric energy exploit naturally occurring flow energy in a well flow, for example in a petroleum outflow. A portion of this flow energy is exploited for driving an energy-producing rotary device in the well. These rotary devices all have in common that they require some form of mechanical support of the rotary device. Examples of such devices are described in U.S. Pat. Nos. 4,415,823; 6,011,334; 6,848,503, and in WO 97/01018. Various particles in the well flow will expose such a mechanical support to erosion and wear during the course of flow. This situation is unfortunate and is assumed to represent a significant risk factor of such a rotary device. This situation may thus shorten the lifetime of such an energy generator to the extent of being useless in practice.

Use of so-called fluid bearings, i.e. a non-mechanical support comprised of a very thin fluid layer, is known from other technical areas of application. For example, fluid bearings are used for supporting motors that drive hard discs in computers. U.S. Pat. No. 6,905,247 describes an example of such a fluid bearing.

Moreover, U.S. Pat. No. 6,179,554 describes an invention employing a fluid bearing for supporting a turbine. However, this invention uses a traditional mechanical support in addition to the fluid bearing. Two different fluids are also used for supporting the turbine and the turbine energy carrier, respectively.

The present invention also employs such a fluid bearing in the form of a generator-driving fluid. Contrary to the prior art, the primary task of this generator-driving fluid is to carry energy to the present generator, and the secondary task thereof is to function as a fluid bearing for the at least one rotating component of the generator during the operation thereof. During operation, this fluid bearing typically will have a layer thickness in the order of a few millimetres. This is substantially larger than that of the above-mentioned prior art fluid bearings, and substantially larger than most of the particles to be encountered in the generator-driving fluid.

THE OBJECT OF THE INVENTION

The principal object of the invention is to avoid or reduce the abovementioned disadvantages of the prior art.

More specifically, the object of the invention is to provide a technical solution for fluid-driven production of electric energy in inaccessible regions and in vicinity of equipment intended to make use of the energy produced in situ. A subterranean well represents an example of such an inaccessible region.

A further object of the invention is to provide such a technical solution without making use of mechanical supports, which are undesirable in this connection. Such mechanical supports are easily exposed to erosion and associated damages and destructions if brought into contact with particles in a fluid employed for said energy production.

How to Achieve the Object

The object is achieved in accordance with features disclosed in the following description and in the subsequent claims.

According to a first aspect of the invention, a generator for fluid-driven production of electric energy by means of electromagnetic induction is provided.

In its most basic form, the generator comprises a stator provided with at least one coil connected to at least one electric circuit. The generator also comprises a rotor provided with at least one permanent magnet. The distinctive characteristic of the generator is that said stator is formed as a turbine housing having at least one internal cavity;
- wherein at least one independent rotor body is arranged in said cavity, and the rotor body is without a fixed mechanical support in the turbine housing, the rotor body also having the function of a turbine wheel;
- wherein the turbine housing comprises at least one supply channel and at least one discharge channel connected to said cavity for throughput of a generator-driving fluid;
- wherein the cavity is of a circular shape along at least one path of rotation in the cavity;
- wherein the rotor body is of a rotary-symmetrical shape for allowing rotation of the rotor body along the at least one path of rotation in the cavity; and
- wherein the turbine housing is provided with at least one coil at the periphery of the cavity, whereas the rotor body is provided with at least one permanent magnet at the periphery of the rotor body. Said fluid may thus be conducted onwards to the cavity in order to rotate the rotor body in the cavity for production of electric energy from the coil.

The generator-driving fluid may be comprised of a liquid and/or a gas, for example water, oil and/or hydrocarbon gas. Such fluids are common in a well flow.

In a preferred embodiment of the generator, said coil and permanent magnet are arranged within the same plane along a path of rotation for the rotor body. Such an assembly contributes to an increased magnetic flux through the coil during operation of the generator.

If the generator comprises at least two coils and at least two permanent magnets, preferably the coils and the permanent magnets are distributed in an equidistant manner along said path of rotation.

Preferably, the axis of said coil is also directed radially towards the centre of the cavity, which also contributes to an increased magnetic flux through the coil during operation of the generator.

Said cavity may be cylindrical or spherical. In this connection, the rotor body may be cylindrical or spherical.

The fact that the rotor body is of a rotary-symmetrical shape, also implies that the rotor body may be of a different external shape than that of a continuous cylindrical or spherical shape. Thus, the rotor body may also be of a polygonal shape, for example a triangular shape, as for the rotor in a Wankel engine. Preferably, the permanent magnets are arranged at each corner in such a polygonally shaped rotor body. Alternatively, the rotor body may comprise an independent, central rotary unit, for example a hub or a rotary shaft, which is arranged centrally in the cavity. The central rotary unit may be provided with radially projecting elements, for example spokes, struts, blades, wings, fins, vanes, propellers or similar, having said permanent magnets arranged at their free ends.

Preferably, said at least one supply channel is directed tangentially into the cavity at the periphery thereof. This is particularly advantageous in the event that the external shape of the rotor body differs from a continuous cylindrical or spherical shape.

Moreover, the at least one discharge channel may be directed tangentially outwards from the cavity at the periphery thereof. Thereby, the centrifugal force is exploited to ease the removal of particles in said generator-driving fluid during operation of the generator, whereby erosion of the rotor body is reduced.

Erosion of the rotor body due to particles in said fluid may also be avoided by allowing said supply channel to be directed non-tangentially into the cavity at the periphery thereof, and having a curvature in the direction of the centre of the cavity. In this embodiment, the centrifugal force is also exploited to ease said removal of particles during operation.

The generator may also comprise at least one secondary flow channel directed radially outwards from the periphery of the cavity. Among other things, this secondary flow channel has a pressure-equalizing and rotary-stabilizing effect on the rotor body during operation in said cavity. Depending on the particular generator design and the particular operating conditions and needs, such secondary flow channels may also be used for fluid flow onwards to the cavity or outwards therefrom.

As an addition or alternative, and in order to achieve such a pressure-equalizing and rotary-stabilizing effect, the rotor body may be provided with at least one through-going equalizing channel, for example a hole. Preferably, the equalizing channel is arranged parallel to the axis of rotation of the rotor body.

Yet further, at least one coil in the generator may be coreless. A rotation-inhibiting magnetic force between the coil and the permanent magnet during start-up of the generator may thus be avoided.

At least one coil may also be provided with a core made from a non-magnetizable material in order to avoid said rotation-inhibiting magnetic force during start-up of the generator.

As an addition or alternative, at least one coil may be provided with a core made from a magnetizable material. In a region vis-à-vis each coil having a magnetizable core, the wall of the cavity is also formed with a larger radial curvature than the radial curvature of the rotor body, thereby defining a recess in the wall of the cavity. Such a construction of the cavity counteracts frictional contact between the rotor body and the wall of the cavity during operation.

In this connection, the generator may also comprise a dissimilar number of permanent magnets and coils, each of which is distributed in a peripherally equidistant manner. This counteracts a rotation-inhibiting magnetic force during start-up of the generator. Furthermore, if the number of permanent magnets is not divisible with the number or coils, or if the number of coils is not divisible with the number of permanent magnets, only one coil-magnet-pair will exert a rotation-inhibiting magnetic force during start-up of the generator. Such a relationship between the number of coils and permanent magnets minimizes the magnetic-force-related rotational resistance to be overcome for start-up of the generator.

In order to achieve an increased rotational stability for the rotor body during operation, the rotor body may be arranged with an average density being lower than the density of the generator-driving fluid. This may be carried out through a suitable material choice for the rotor body, or by forming one or several gas-filled cavities within the very rotor body.

In order to assist the rotation of the rotor body, the exterior of the rotor body may be provided with at least one propulsion profile for contact with the generator-driving fluid. Preferably, said propulsion profile is a radially projecting blade, wing, fin, vane or propeller. This embodiment variant may also be combined with the preceding embodiment, in which the rotor body comprises an independent, central rotary unit provided with radially projecting elements having permanent magnets at their free ends. In the latter embodiment, the radially projecting elements represent propulsion profiles and also carriers for the permanent magnets of the generator.

Said at least one electric circuit onto which the generator is connected, may also comprise at least one storage medium for electric energy, for example a chargeable battery or a condenser/capacitor. The circuit may also comprise other electric/electronic components, including rectifiers, converters and alike for transforming the induced electromotive voltage from the at least one coil of the generator.

In an advantageous embodiment, the present generator is adapted for connection to a well pipe to be placed in a subterranean well. When in its operational position in the well, such a well pipe will receive a well fluid being conducted via the generator for production of electric energy for downhole equipment arranged in the well. Typically, said well pipe will form a tubular component in a casing string or in a production tubing string within the well. Among other things, said downhole equipment may comprise instruments, including sensors and signal transmitter, control devices, operating equipment, for example valve actuators, as well as various other equipment requiring a supply of electric energy.

In this connection, the generator may be arranged in the pipe wall of the well pipe, for example structured as a sleeve, collar or bulb. Thereby, the generator may be arranged on the outside or inside of the pipe.

Yet further, the generator may be adapted for releasable connection in the well pipe. Thereby, the generator may be introduced in the well after completion of the well. Thus, the generator may be of a tubular shape adapted to fit into the well pipe. This may be of interest both in new and older wells in which a need exists for provided the well with various further downhole equipment requiring a supply of electric energy.

According to a second aspect of the invention, a method of making a generator for fluid-driven production of electric energy by means of electromagnetic induction is provided. The generator comprises a stator having at least one coil being connected to at least one electric circuit, and the generator also comprises a rotor having at least one permanent magnet. The method comprises steps corresponding to the constructive features disclosed for the present generator. The distinctive characteristic of the method is that it comprises the following steps:
- to form said stator as a turbine housing having at least one internal cavity;
- to arrange at least one independent rotor body in said cavity, the rotor body having no fixed mechanical support in the turbine housing, the rotor body (3) also having the function of a turbine wheel;
- to arrange at least one supply channel and at least one discharge channel in the turbine housing, and to connect said channels to said cavity for throughput of a generator-driving fluid;
- to form the cavity with a circular shape along at least one path of rotation therein;
- to form the rotor body with a rotary-symmetrical shape for allowing rotation of the rotor body along the at least one path of rotation in the cavity; and
- to provide the turbine housing with at least one coil at the periphery of the cavity, and to provide the rotor body with at least one permanent magnet at the periphery of the rotor body. Thereby, said fluid may be conducted onwards to the cavity in order to rotate the rotor body in the cavity for production of electric energy from the coil.

In order to achieve a pressure-equalizing and rotary-stabilizing effect on the rotor body during operation in said cavity, at least one secondary flow channel may be directed radially outwards from the periphery of the cavity. As an addition or alternative, and for this purpose, the rotor body may be provided with at least one through-going equalizing channel, which preferably is arranged parallel to the axis of rotation of the rotor body.

In an advantageous embodiment of the method, the generator is adapted for connection to a well pipe to be placed in a subterranean well, insofar as the well pipe, when in operational position in the well, will receive a well fluid being conducted via the generator for production of electric energy for downhole equipment in the well.

In this connection, the generator may be arranged in the pipe wall of the well pipe, for example structured as a sleeve, collar or bulb in the pipe wall.

In a further advantageous embodiment of the method, the generator is adapted for releasable connection in said well pipe, which allows the generator to be introduced in the well after the completion thereof. Preferably, the generator is formed with a tubular shape adapted to fit into the well pipe.

According to the invention, the abovementioned problem of particle erosion and wear on mechanical components is thus solved by allowing a rotor body (or turbine wheel) to rotate freely within a cavity in a turbine housing, the housing of which also functions as a stator. When in the operational position, only the generator-driving fluid physically separates the rotor body from said stator. Accordingly, no mechanical supports are used between the rotor body and the turbine housing. The energy being generated by having at least one permanent magnet in the rotor body induce an alternating magnetic flux, and hence an electromotive voltage, in at least one coil of the stator, is connected to at least one electric circuit. In principle, this electric circuit may supply electric energy directly to electric and electronic components. In practice, it will be more appropriate, however, to store produced electric energy in at least one storage medium, for example in a chargeable battery or in a condenser/capacitor. As mentioned, the electric circuit may also comprise various other components, such as rectifiers, converters and alike. Such a storage medium for electric energy may also function as a power transformer. Such a power transformer may provide enough power to components having a relatively large power requirement during short time intervals, such as valve actuators and alike.

SHORT DESCRIPTION OF THE FIGURES

In the following, non-limiting embodiment examples of the present invention will be described with reference to the following figures, in which:

FIG. 1 shows a longitudinal section through a completion interval of an oil well provided with a preferred embodiment of a generator according to the invention, the generator in this embodiment example being arranged on the outside of an eccentric longitudinal region of a production tubing in the well;

FIG. 2 also shows a longitudinal section through a generator which essentially is identical to the embodiment example according to FIG. 1, but which has a somewhat differently shaped supply channel onwards into a spherical cavity in the generator;

Figure 6:
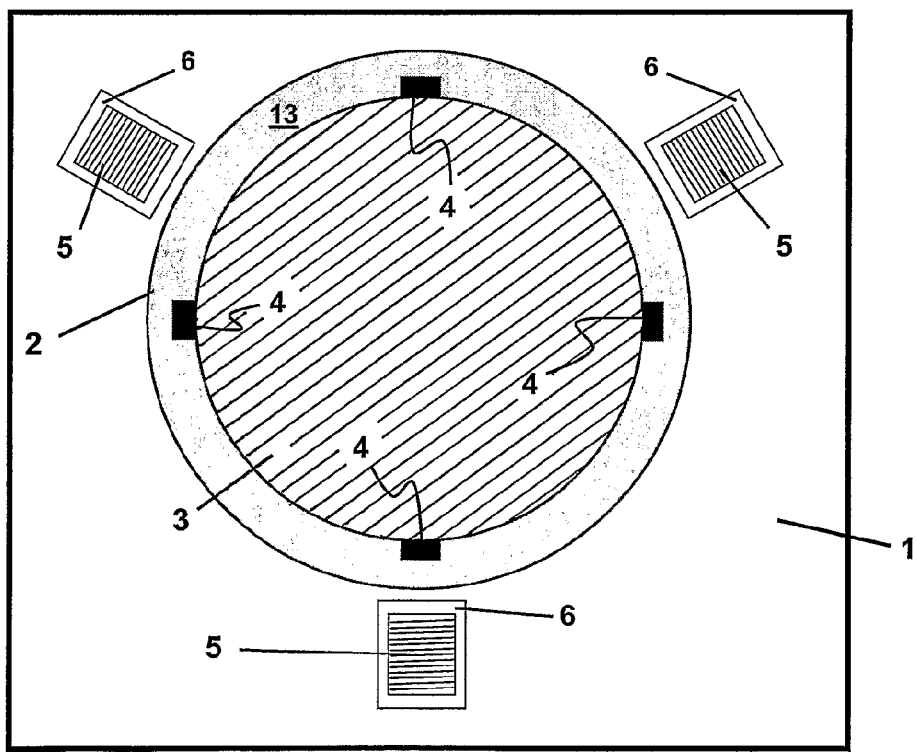
Figure 7:
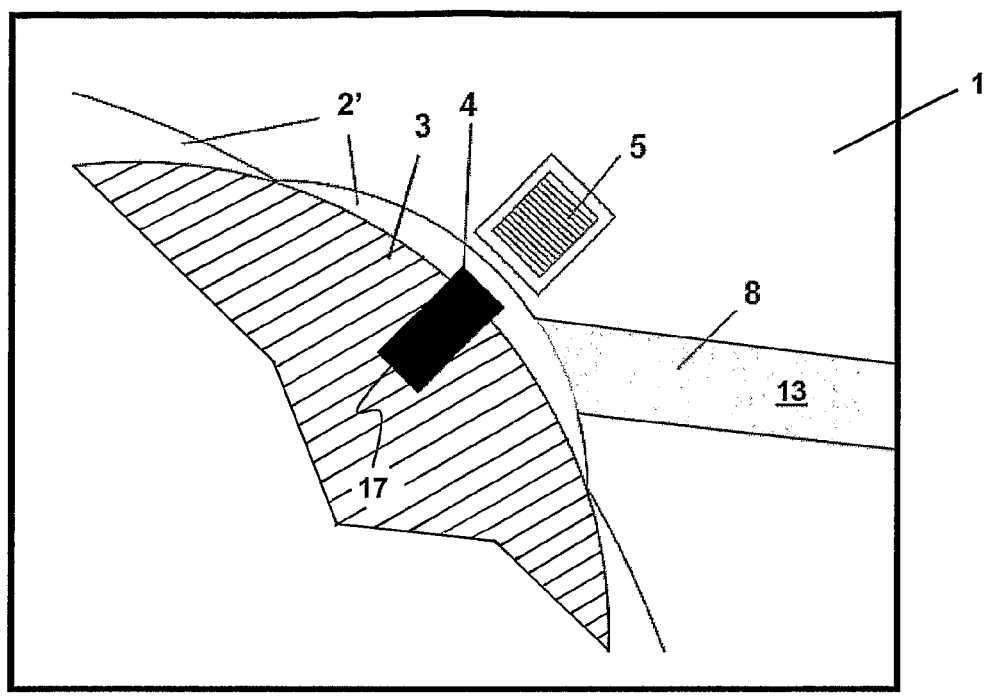

FIG. 6 shows a preferred embodiment of the generator, and it shows a section through said cavity and rotor body, and which also shows four permanent magnets and three coils, each of which are distributed in an equidistant manner along a path of rotation for the rotor body; and FIG. 7 shows a part section through an alternatively shaped spherical cavity in the generator, in which the figure shows a region of the wall of the cavity formed with a recess vis-à-vis a coil having a magnetizable core.

The figures are schematic and also distorted with respect to the shapes, relative dimensions and relative positions of the components with respect to one another. In the following, identical or corresponding components and/or details in the figures will be denoted with the same reference numeral.

DESCRIPTION OF EMBODIMENT EXAMPLES OF THE INVENTION

Figure 1:
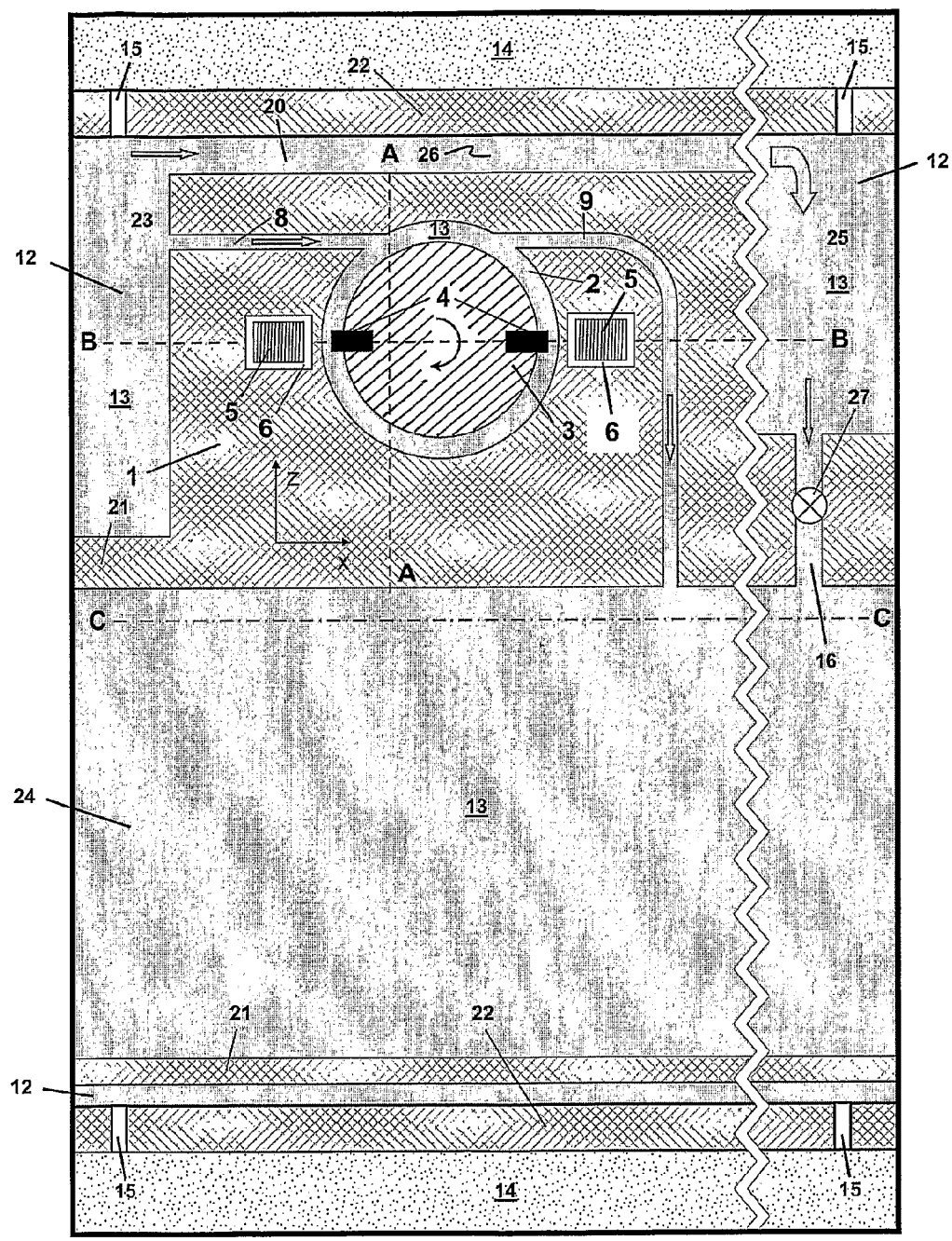
Figure 2:
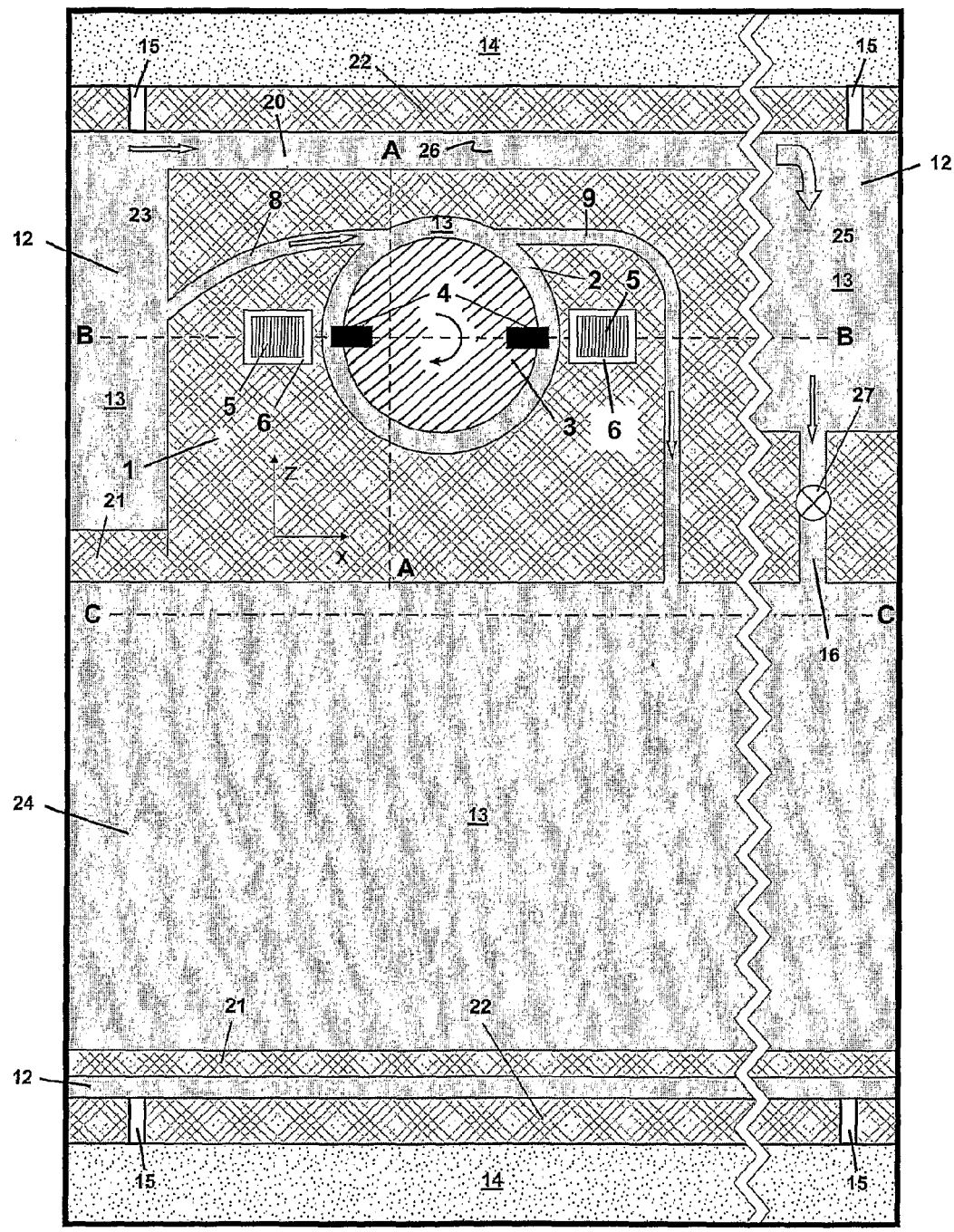

FIG. 1 shows a preferred embodiment of the present generator, whereas FIG. 2 shows a somewhat modified embodiment of the first-mentioned embodiment. FIGS. 3-7 show further details of the generator and/or alternative embodiments thereof. The constructive features and general mode of operation of the generator will now be described in further detail.

Figure 3:
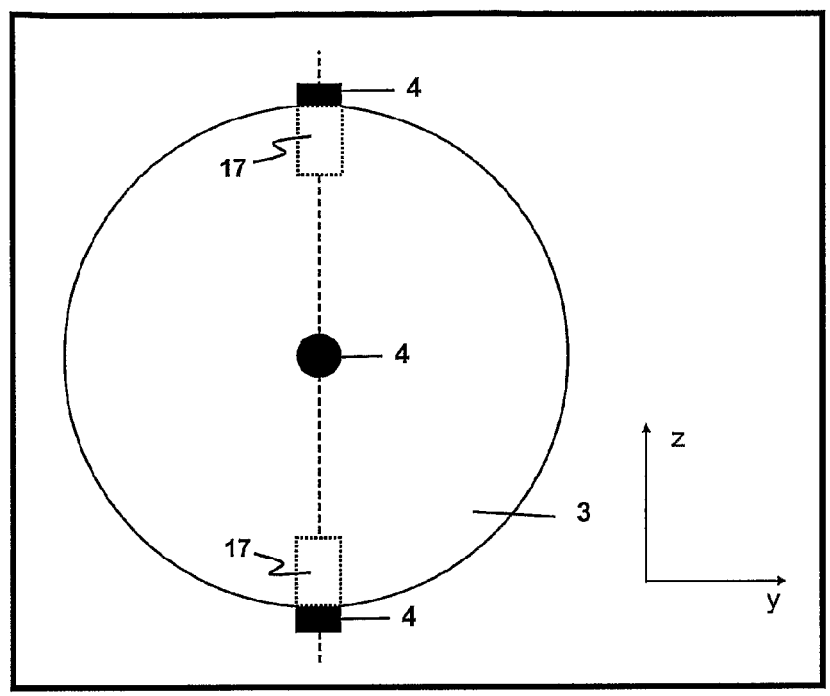
FIG. 3 shows, in larger scale, a projection of the surface of a spherical rotor body in the generator shown in FIGS. 1 and 2, in which said rotor body is provided with permanent magnets at the periphery thereof.
Figure 4:
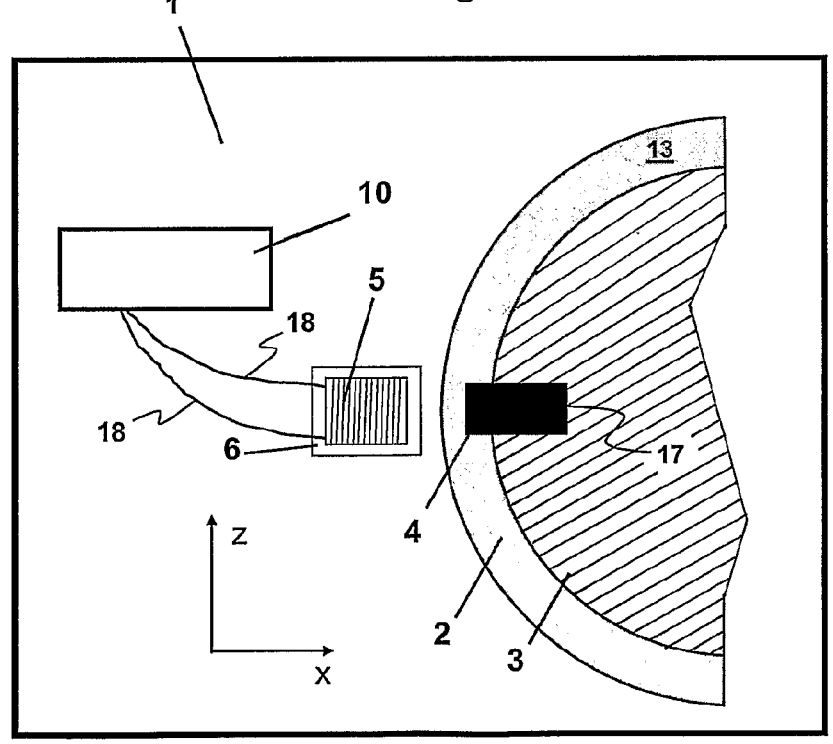
FIG. 4 shows, in larger scale, a part section through the generator shown in the preceding figures, in which the figure shows, among other things, a permanent magnet and a coil in the generator, and in which said coil is shown connected to an external electric circuit.
Figure 5:
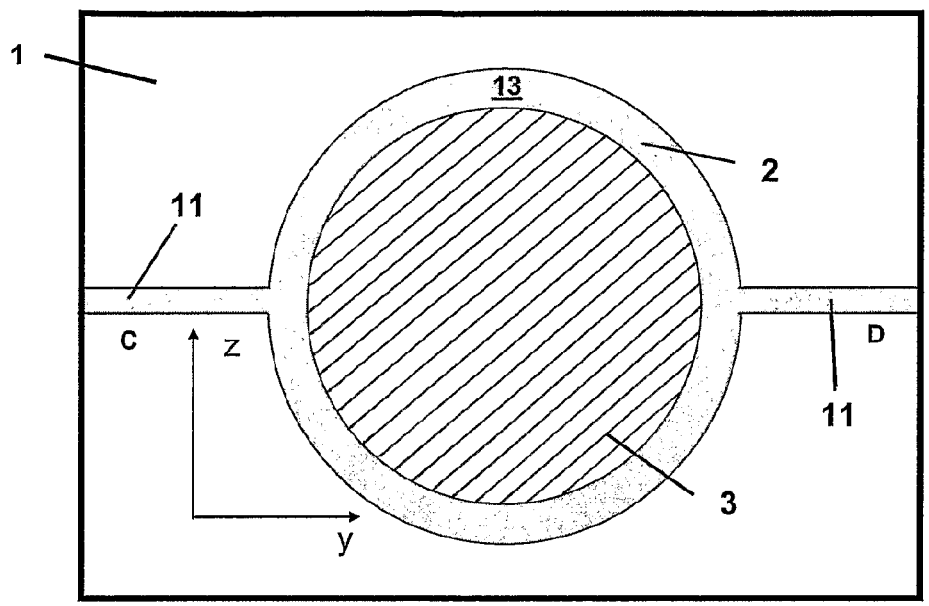
FIG. 5 shows an alternative embodiment of the generator, and it shows a section through a spherical cavity within which a spherical rotor body is placed, and in which secondary flow channels are directed diametrically and radially outwards from the cavity.

Said figures refer to a Cartesian coordinate system, the x-axis and z-axis of which are shown in FIGS. 1, 2 and 4, whereas the y-axis and the z-axis of the coordinate system are shown in FIGS. 3 and 5. The y-axis is perpendicular to a plane through the x- and z-axes. As such, the axes of the coordinate system define different planes through respective pairs of axes, including an x-z plane, a y-z plane and an x-y plane. The origo of the coordinate system is located in the centre of a cavity 2 arranged internally in the present generator, which herein is denoted with the reference numeral 20.

FIGS. 1 and 2 show a longitudinal section through a completed section of a producing oil well provided with said generator 20. The generator 20 is shown in operation in said figures. It is pointed out that the generator 20 just as well may be arranged in another type of well, for example an injection well, observation well, geothermal well or similar. As such, the present invention may also be used in connection with other types of well pipes and tubular downhole units, including sand screens.

In FIGS. 1 and 2, the generator 20 is shown arranged on the outside of an eccentrically arranged longitudinal region of a production tubing 21. The production tubing 21 is arranged within a casing 22 in the well, and the interstice between the pipes 21, 22 thus defines an annulus 12. The dashed line C-C in the figures denotes the central axis of the casing 22. Placement of the generator 20 in said eccentric longitudinal region is suitable for providing as much space as possible for the generator 20 in the casing 22.

During production of crude oil 13 from a surrounding reservoir formation 14, crude oil 13 flows into said annulus 12 via suitable perforations 15 in the casing 22, possibly also via one or several sand screens (not shown). A branch flow of the crude oil 13 is conducted via the generator 20 for the driving thereof and thus to produce electric energy in situ in the well. Said oil branch flow is then conducted into an oil main flow in an internal flow space 24 in the production tubing 21. Flow of crude oil 13 is denoted with downstream-directed arrows in FIGS. 1 and 2.

Yet further, the generator 20 comprises a stator and a rotor. The generator 20 is also connected to an electric circuit 10 which, for the sake of simplicity, only is shown schematically in FIG. 4. Such an electric circuit 10 may comprise electric wires connecting the generator 20 to electric converters, storage units (for example batteries) and similar.

According to the invention, the stator is formed as a turbine housing 1 comprising an internal, spherical cavity 2. An independent and spherical rotor body 3 is arranged in the spherical cavity 2, and the rotor body 3 is without a fixed mechanical support in the turbine housing 1. Thereby, the rotor body 3 also has the function of a turbine wheel in the cavity 2. Moreover, the turbine housing 1 comprises a supply channel 8 and a discharge channel 9, both of which are connected to the cavity 2 and ensure hydraulic communication between said annulus 12 and the internal flow space 24 in the production tubing 21. Said oil branch flow may thus flow through the generator 20 for the driving thereof. The embodiments according to FIGS. 1 and 2 differ from one another only by virtue of the shape of said supply channel 8, which will be described hereinafter.

Due to the cavity 2 according to FIGS. 1 and 2 being spherical, the periphery of the cavity 2 is of a circular shape in several imaginable paths of rotation therealong. The same applies to the spherical rotor body 3, which is of a rotary-symmetrical shape allowing, if desirable, rotation of the rotor body 3 along several paths of rotation in the cavity 2. In the embodiment examples according to FIGS. 1 and 2, the turbine housing 1 is provided with two coreless coils 5 at the periphery of the cavity 2. However, the rotor body 3 is provided with four cylindrical permanent magnets 4 at its periphery, only two permanent magnets 4 of which are shown in the figures. Each of the coils 5 are placed in a coil chamber 6 in the turbine housing 1, and the coil chambers 6 are arranged at a small distance (material thickness) from the cavity 2. Both the coils 5 and the permanent magnets 4 are distributed in an equidistant manner along a path of rotation within an equatorial plane through the rotor body 3 and the cavity 2, i.e. through said x-z plane. The axes of the coils 5 and the permanent magnets 4 are also arranged within said x-z plane as well as being directed radially inwards toward the centre of the cavity 2, which contributes to an increased magnetic flux through the coils 5 during operation. By using coreless coils 5, attractive magnet forces are also avoided, the forces of which may complicate the start-up of the generator 20. Even though the coils 5 according to the figures are of identical size and shape, the coils 5 may have any random shape and size in other embodiments of the generator 20.

As an alternative to the embodiments according to FIGS. 1 and 2, the generator 20 may just as well be arranged on the inside of the pipe wall of the production tubing 21, or within the very production tubing 21. If arranged on the inside of said pipe wall, the generator 20 may receive a generator-driving fluid from the annulus 12 via at least one supply channel 8 through the pipe wall of the production tubing 21. If arranged within the very production tubing 21, the generator 20 may receive a generator-driving fluid via at least one supply channel 8 connected directly to the fluid main flow in the internal flow space 24 of the production tubing 21. Advantageously, the latter embodiment variant may be used if the generator 20 is adapted for releasable connection in the well pipe 21, 22, for example by allowing the generator 20 to be of a tubular shape adapted to fit into the production tubing 21. Thereby, the generator 20 may be introduced in the well after the completion thereof.

FIGS. 1 and 2 also show a constricted annulus passageway 26 between the generator 20 and the casing 22, and between an upstream region 23 and a downstream region 25 of the annulus 12. Yet further, said downstream region 25 of the annulus 12 is hydraulically connected to the flow space 24 of the production tubing 21 via a hole 16 in the pipe wall. The hole 16 is provided with an adjustable valve 27 for flow control of the oil flow. Strictly speaking, and depending on the flow rate in the well, said annulus passageway 26 is not required. However, such an annulus passageway 26 will ensure hydraulic communication in the well should the generator 20 fail, or if said supply channel 8 and/or discharge channel 9 become(s) closed.

Said oil branch flow is conducted into the cavity 2 of the generator 20 via said supply channel 8. A thin oil layer of the branch flow then flows in a flow path around the rotor body 3, and between the rotor body 3 and the wall of the cavity 2. The oil branch flow through the generator 20 transmits forces to the rotor body 3 through hydrodynamic pressure (velocity energy) and shear stresses that cause the rotor body 3 to rotate around the axis of rotation thereof, as indicated with a curved arrow in FIGS. 1 and 2. Yet further, hydrodynamic forces in the branch flow will contribute, via a so-called Bernoulli-effect, to stabilize the rotor body 3 dynamically with respect to any translational motions along said axis of rotation. More particularly, in this context said Bernoulli-effect is represented by the following equation:

$$P_1 + \frac{1}{2}\rho v_1^2 = P_2 + \frac{1}{2}\rho v_2^2 + w_m + h_f;$$

in which:
- $P_n$ represents static pressure in a generator-driving liquid at a position n of the path of rotation;
- $w_m$ represents mechanical work carried out by the liquid on the surroundings between two different flow path positions 1 and 2; and
- $h_f$ represents energy expended between said positions 1 and 2 due to friction between the liquid and the wall of a surrounding flow channel.

The other terms in the equation represent the dynamic pressure at flow path positions 1 and 2, in which:
- $\rho$ represents the density of the liquid; and
- $v_n$ represents the velocity of the liquid.

The equation is based on energy conservation, and it represents a generalization of the Bernoulli equation including mechanical work and viscous pressure loss between said positions 1 and 2. The equation also assumes flow of an incompressible liquid, the liquid of which does not exchange heat with the surroundings. The equation may also be modified for flow of a compressible fluid, such as a gas, which on the contrary will exchange heat with the surroundings. In this connection, such a heat exchange will not have any significant influence on the mode of operation of the present generator 20.

In the embodiments according to FIGS. 1 and 2, position 1 is localized to said upstream annulus region 23, in which the velocity of the crude oil 13 is insignificant, and position 2 is localized to a region near the surface of the rotor body 3. The abovementioned equation may thus be rewritten in the following manner:

$$P_1 \approx P_2 + \frac{1}{2}\rho v_2^2 + w_m + h_f.$$

Assuming that said energy contribution $w_m$ and $h_f$ remain substantially unchanged, the equation thus expresses that an increase in the local flow velocity $v_2$ will bring about a corresponding reduction in the static pressure $P_2$ in a given flow region. With respect to operations-related, axial translational motions of the rotor body 3 along its predominant path of rotation (i.e. along the y-axis in the set of figures), this Bernoulli-effect will contribute to stabilize the rotor body 3 in the cavity 2. Upon axial translational motion of the rotor body 3 in one direction, one side of the rotor body 3 will be closer to the wall of the cavity 2 than that of the axially opposite side of the rotor body 3. This situation provides a choking effect in the flow region closest to the wall of the cavity 2, which results in a higher flow velocity, and hence a lower static pressure, on the opposite side of the rotor body 3. This operations-related difference in static pressure at said two sides of the axis of rotation generates a net force, which at any time will seek to counteract translational motions of the rotor body 3 along the axis of rotation thereof (i.e. along said y-axis). This stabilizes the rotor body 3 sideways during operation. Such a stabilizing effect has also been verified through tests.

Moreover, the turbine housing 1 according to FIGS. 1 and 2 is divided into two turbine housing parts for the purpose of placing the rotor body 3 in said cavity 2 therein. The dividing plane between the turbine housing parts is denoted with a dashed line A-A in the figures. Interconnection of these two turbine housing parts may be carried out by means of suitable coupling devices, for example screws or similar, and by means of leakage-preventive gaskets arranged therebetween. In a preferred embodiment, the dividing plane A-A is placed so as to avoid cutting or touching of essential components or details in the generator 20, including said coil chambers 6, the supply channel 8 and the discharge channel 9. In the examples according to FIGS. 1 and 2, the dividing plane A-A is parallel to said y-z plane through the centre of the cavity 2. Thereby, a better hydraulic seal is achieved along the dividing plane A-A.

The embodiment according to FIG. 1 shows a supply channel 8 directed tangentially into the cavity 2 at the periphery thereof. More specifically, the supply channel 8 is composed of a straight flow channel arranged in the turbine housing 1, the channel of which is arranged within said x-z plane and parallel to the x-axis through the centre of the cavity 2. The discharge channel 9 of the generator 20 is also arranged within said x-z plane and also along an imaginary extension line from the supply channel 8, whereby the discharge channel 9 runs tangentially outwards from the cavity 2 at the periphery thereof. Also the discharge channel 9 is arranged in the turbine housing 1 and is deflected in the direction of the internal flow space 24 of the production tubing 21. The supply channel 8 connects said upstream region 23 of the annulus 12 to the cavity 2, whereas the discharge channel 9 connects the cavity 2 to said internal flow space 24. An advantage of this embodiment is that any particles in the generator-driving crude oil 13 will be hurled out of the cavity 2 and into said discharge channel 9 in response to the centrifugal force arising during rotary flow in the cavity 2. The thin oil layer existing between the rotor body 3 and the wall of the cavity 2 during operation of the generator 20, also supports the rotor body 3 against the surrounding turbine housing 1, and without using any form of fixed mechanical support for this purpose. This construction counteracts erosion of vital components in the generator 20.

Among other things, the efficiency of the generator 20 may be optimized through suitable placement of the supply channel 8 and the discharge channel 9 relative to the cavity 2. As such, the contact positions and contact angles of the channels 8, 9 with respect to the periphery of the cavity 2, may be adapted to the particular needs in order to achieve an adapted and/or optimum efficiency for the generator 20. Thereby, the forces acting on the particles in the generator-driving fluid and on the rotor body 3 during operation may also be adapted, among other things, with respect to optimizing the efficiency of the generator 20, its ability to conduct particles out of the cavity 2, and its ability to counteract particle-related erosion.

In this connection, FIG. 2 and FIG. 7 show a second embodiment of said supply channel 8. In this figure, the supply channel 8 is directed non-tangentially into the cavity 2 at the periphery thereof, and having a curvature in the direction of the centre of the cavity 2. Such an embodiment of the supply channel 8 contributes to further increase said centrifugal force and is particularly suitable for separating out particles having a higher density than the density of the generator-driving fluid, for example sand particles.

FIG. 3 shows a projection within said y-z plane of the surface of the spherical rotor body 3 shown in FIGS. 1 and 2. In this projection, three of the four permanent magnets 4 of the rotor body 3 are shown at the periphery thereof. A portion of each permanent magnet 4 is recessed within a cylindrical hole 17 in the surface of the rotor body 3 and may be attached thereto by means of threads, glue or other suitable fixing means. The upper portion of each permanent magnet 4 protrudes radially outside the surface of the rotor body 3. This outwardly protruding portion has the same function as a blade in a turbine wheel, whereby a larger proportion of the energy of the generator-driving branch flow is transmitted to the rotor body 3. Thereby, a greater efficiency is also achieved for the generator 20.

In the preferred embodiment, each permanent magnet 4 is magnetized along a symmetry axis thereof, the axis of which is denoted with a dashed line B-B in the figures, and the symmetry axes are perpendicular to the surface of the rotor body 3. In alternative embodiments of the invention, however, the permanent magnets 4 may be of any random shape and be mutually different. Their axes of magnetization may also have different directions. Yet further, the permanent magnets 4 may have any suitable placement in or on the rotor body 3, including a different radial placement and a different mutual placement relative to one another. In addition to being placed radially at the periphery of the rotor body 3, the permanent magnets 4 normally are made from a material having a higher density than that of other parts of the rotor body 3. Provided that the permanent magnets 4 are balanced correctly, such a construction will further stabilize the rotor body 3 during operation.

FIG. 4 shows further details of the generator 20 according to FIGS. 1 and 2. The figure shows a permanent magnet 4 on the rotor body 3, the magnet of which induces a time variable flux through a coil 5. This magnetic flux forms an electromotive voltage which, via electric wires 18 connected to the coil 5, drives an external electric circuit 10. Preferably, the coil 5 is without a core or contains a core made from a non-magnetizable material. An attractive magnet force between the permanent magnet 4 and the coil 5 is thus avoided, insofar as such a magnet force may complicate the start-up of the generator 20.

Reference is now made to FIG. 5, which shows a section in said y-z plane through the cavity 2. The figure illustrates an alternative embodiment in which secondary flow channels 11 are arranged in the turbine housing 1. The flow channels 11 are directed in a diametrically and radially emerging manner from the periphery of the cavity 2, thereby coinciding in direction with the axis of rotation of the rotor body 3. During operation, and in this embodiment, said branch flow of crude oil 13 is conducted out of the cavity 2 through at least one primary discharge channel 9 (not shown in FIG. 5) and also through the secondary flow channels 11. Thereby, some crude oil 13 may be conducted out of the cavity 2 through each of the secondary flow channels 11 and onwards to external discharge regions C and D indicated in FIG. 5. For example, such discharge regions C and D may be comprised of said upstream and/or downstream regions 23, 25 of the annulus 12, and/or of the internal flow space 24 in the production tubing 21. This embodiment reduces the influence of gravity and the spatial orientation of the generator 20 on said particles in the crude oil 13, which eases the discharge of particles from the cavity 2. When the spherical rotor body 3 rotates in the spherical cavity 2, such diametrically directed flow channels 11 also contribute to a faster pressure-equalization in the crude oil 13 in the cavity 2, which provides a rotary-stabilizing effect on the rotor body 3 during operation. In this connection, it must also be mentioned that such secondary flow channels 11 may be used for directing fluid flow into the cavity 2, insofar as the flow direction of the fluid depends on the specific generator design and the specific operating conditions and requirements.

As an addition or alternative, and for the same purpose, the rotor body 3 may be provided with a through-going hole arranged parallel to the axis of rotation of the body (not shown in the figure), for example along the axis of rotation. A faster pressure-equalization is thus achieved between said two sides of the axis of rotation of the rotor body 3.

In a preferred embodiment of the generator 20, such secondary flow channels 11 are combined with the constructive features described and shown in FIGS. 1 and 2. A better efficiency is thus achieved for the generator 20.

FIG. 6 shows a section in said x-z plane through a spherical cavity 2, insofar as this plane also forms an equatorial plane through the spherical rotor body 3 and the cavity 2. In this embodiment example, the coils 5 of the generator 20 are provided with magnetizable cores, which contribute to an increased magnetic flux through each coil 5 during operation. In order to reduce rotation-inhibiting magnetic forces during start-up of the generator 20, the generator 20 is provided with a dissimilar number of permanent magnets 4 and coils 5. More specifically, it is provided with four permanent magnets 4, i.e. an even number, and three coils 5, i.e. an odd number. Thereby, essentially one coil-magnet-pair only will exert a rotation-inhibiting magnetic force during start-up of the generator 20. The permanent magnets 4 are evenly distributed along the periphery of the rotor body 3, whereas the coils 5 are evenly distributed along the periphery of the cavity 2, all of which are arranged within said equatorial x-z plane.

FIG. 7 shows an alternative embodiment of the spherical cavity 2 of the generator 20. The figure shows a portion of a spherical rotor body 3 arranged in the cavity 2, in which the rotor body 3 is provided with a permanent magnet 4 having a magnetizable core, and in which the permanent magnet 4 is arranged in vicinity of a coil 5 in a turbine housing 1. The figure also shows a local region of the wall of the cavity 2 being formed with a recess 2' vis-à-vis, and radially inside of, said coil 5. Said wall region is formed with a larger radial curvature than the radial curvature of the rotor body 3, thereby defining the recess 2' in the cavity 2. FIG. 7 also shows a supply channel 8 directed non-tangentially into the cavity 2 at the periphery thereof, and having a curvature in the direction of the centre of the cavity 2, which is similar to the embodiment according to FIG. 2.

When the rotor body 3 according to FIG. 7 rotates in the cavity 2, such a construction of the cavity 2 will counteract frictional contact between the rotor body 3 and the wall of the cavity 2. This effect is achieved in response to the magnetic force between the permanent magnet 4 and the core in the coil 5, the force of which attracts the rotor body 3 towards the wall of the cavity 2 so as to reduce the distance therebetween. Gradually, said recess 2' will form a temporary closed cavity between the rotor body 3 and said wall. Said oil branch flow being supplied via the supply channel 8 will thus form a temporary overpressure in said closed cavity. This overpressure will then push the rotor body 3 a small distance away from the wall of the cavity 2, which minimizes or eliminates mechanical contact, and hence frictional contact, therebetween.

Advantageously, the rotor body 3 according to all figures may have an average density being lower than the density of the generator-driving crude oil 13. As mentioned, this may be achieved through a suitable material choice for the rotor body 3, or by forming one or several gas-filled cavities, for example chambers, within the very rotor body 3. The oil layer, which rotates around the rotor body 3 during operation, will set up pressure gradients seeking to centre, and hence stabilize, the rotor body 3 in the cavity 2. A lower average density of the rotor body 3 will contribute to achieve a further stability of the rotor body 3 in the cavity 2 during operation. However, tests have verified that a good stability is also achieved when the rotor body 3 does not have an average density being lower than the density of the generator-driving fluid.

Obviously, the embodiments of the present invention described and shown in the attached figures may be combined in many ways. Correspondingly, it is obvious that the invention also comprises embodiment variants that combine features of the figures with features not shown in the figures but nevertheless described herein without reference to any figures. Similarly, it is obvious that the invention also comprises embodiment variants that only combine features described hereinbefore without reference to any of the attached figures.

The invention claimed is:

1. A generator comprising a stator provided with at least one coil connected to at least one electric circuit, and also a rotor provided with at least one permanent magnet, wherein said stator is formed as a turbine housing having at least one internal cavity;
   wherein at least one independent rotor body is arranged in said cavity, and the rotor body is without a fixed mechanical support in the turbine housing;
   wherein the turbine housing comprises at least one supply channel and at least one discharge channel connected to said cavity for throughput of a generator-driving fluid;
   wherein the cavity is of a circular shape along at least one path of rotation therein;
   wherein the rotor body is of a rotary-symmetrical shape for allowing rotation of the rotor body along the at least one path of rotation in the cavity; and
   wherein the turbine housing is provided with at least one coil at the periphery of the cavity, wherein the rotor body is provided with at least one permanent magnet at the periphery of the rotor body; wherein said fluid may be conducted onwards to the cavity in order to rotate the rotor body in the cavity for production of electric energy from the coil.

2. The generator of claim 1, wherein the coil and the permanent magnet are arranged in the same plane along a path of rotation for the rotor body.

3. The generator of claim 2 wherein the generator comprises at least two coils and at least two permanent magnets and the coils and the permanent magnets are distributed in an equidistant manner along said path of rotation.

4. The generator of claim 1 wherein the axis of said coil is directed radially towards the center of the cavity.

5. The generator of claim 1 wherein the cavity is cylindrical.

6. The generator of claim 1 wherein the cavity is spherical.

7. The generator of claim 1 wherein the rotor body is cylindrical.

8. The generator of claim 1 wherein the rotor body is spherical.

9. The generator of claim 1 wherein the rotor body is of a polygonal shape.

10. The generator of claim 1 wherein said supply channel is directed tangentially into the cavity at the periphery thereof.

11. The generator of claim 1 wherein said at least one discharge channel is directed tangentially outwards from the cavity at the periphery thereof.

12. The generator of claim 1 wherein said supply channel is directed non-tangentially into the cavity at the periphery thereof, and having a curvature in the direction of the centre of the cavity.

13. The generator of claim 1 wherein at least one coil is coreless.

14. The generator of claim 1 wherein the generator is adapted for placement in a subterranean well for production of electric energy for downhole equipment in the well.

15. The method according to claim 1 further comprising directing at least one secondary flow channel radially outwards from the periphery of the cavity.

16. The method according to claim 1 further comprising providing the rotor body with at least one through-going equalizing channel.

17. The method according to claim 1 further comprising arranging the equalizing channel parallel to the axis of rotation of the rotor body.

18. The method according to claim 1 further comprising adapting the generator for connection to a well pipe for placement in a subterranean well for production of electric energy for use by downhole equipment in the well.

19. The method according to claim 1 wherein the generator is releasably connected in the well pipe allowing the generator to be introduced in the well after the completion thereof.

20. A method of making a generator for fluid-driven production of electric energy by means of electromagnetic induction, the generator comprising a stator having at least one coil being connected to at least one electric circuit, and a rotor having at least one permanent magnet, wherein the method comprises the following steps:
    forming said stator as a turbine housing having at least one internal cavity;
    arranging at least one independent rotor body in said cavity, the rotor body having no fixed mechanical support in the turbine housing;
    arranging at least one supply channel and at least one discharge channel in the turbine housing, and connecting at least one supply channel to said cavity for throughput of a generator-driving fluid;
    forming the cavity with a circular shape along at least one path of rotation therein; forming the rotor body with a rotary-symmetrical shape for allowing rotation of the rotor body along the at least one path of rotation in the cavity; and providing the turbine housing with at least one coil at the periphery of the cavity, and to provide providing the rotor body with at least one permanent magnet at the periphery of the rotor body.

* * * * *